UNITED STATES PATENT OFFICE.

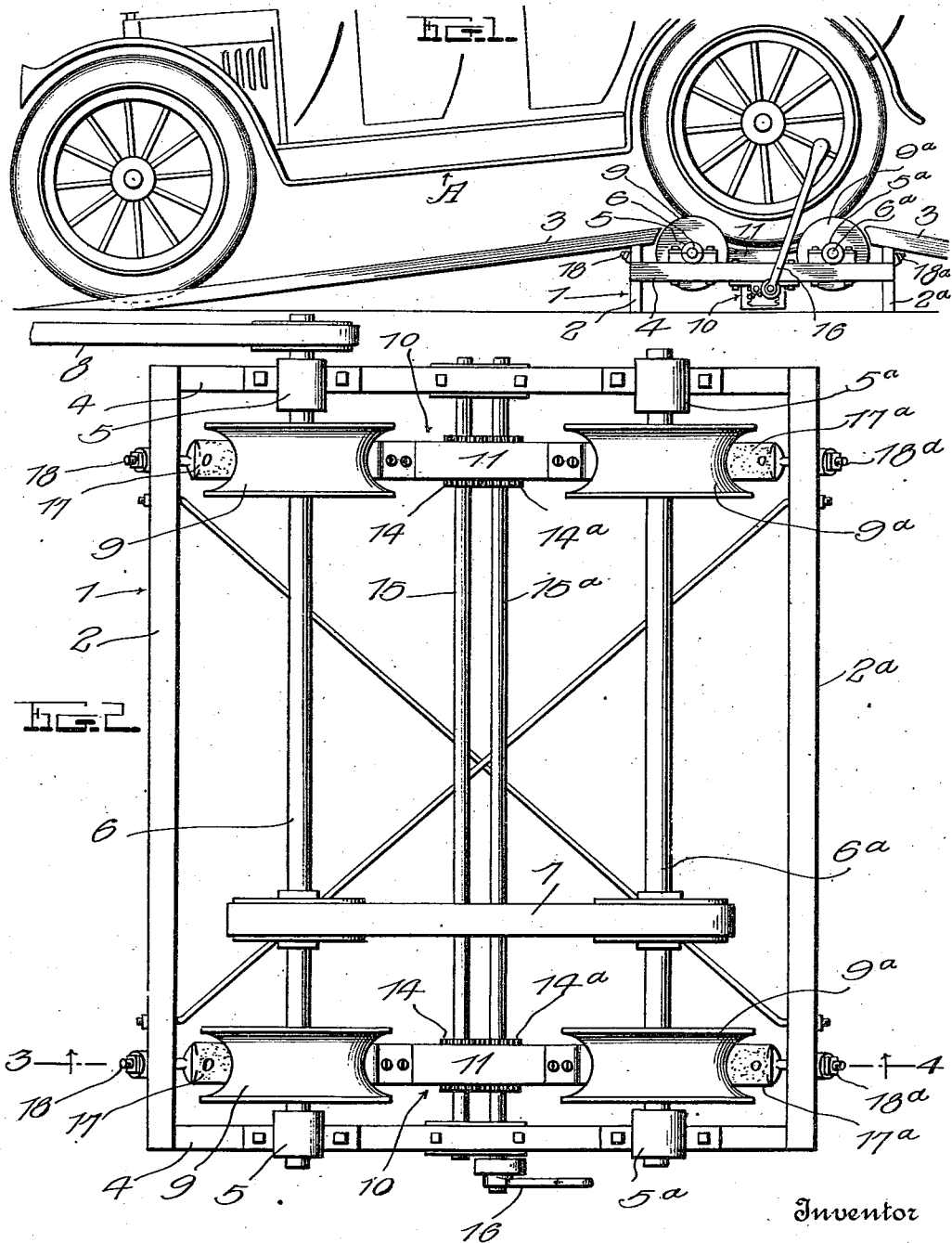

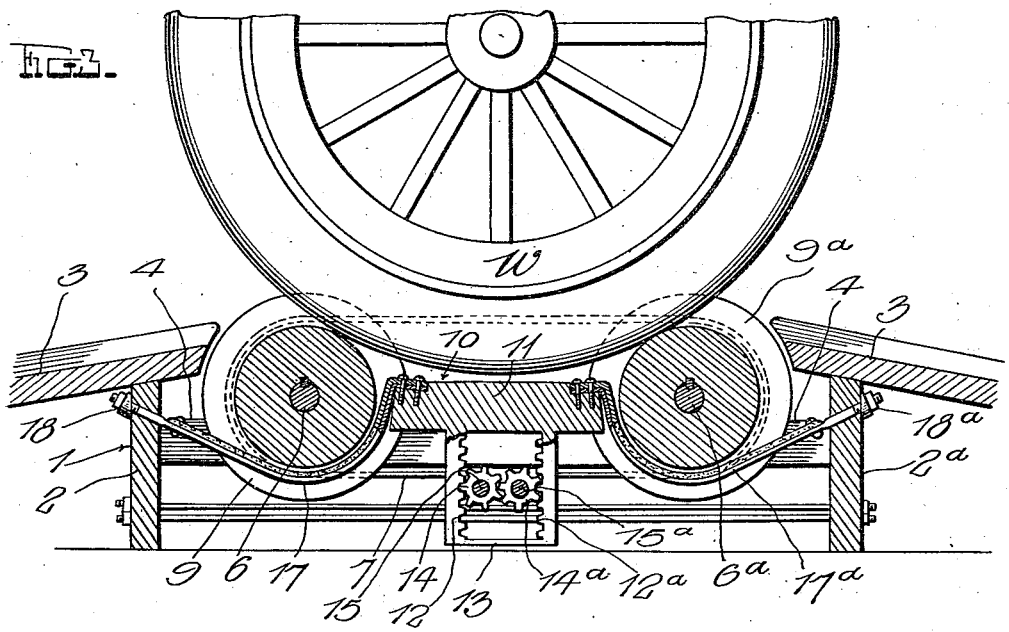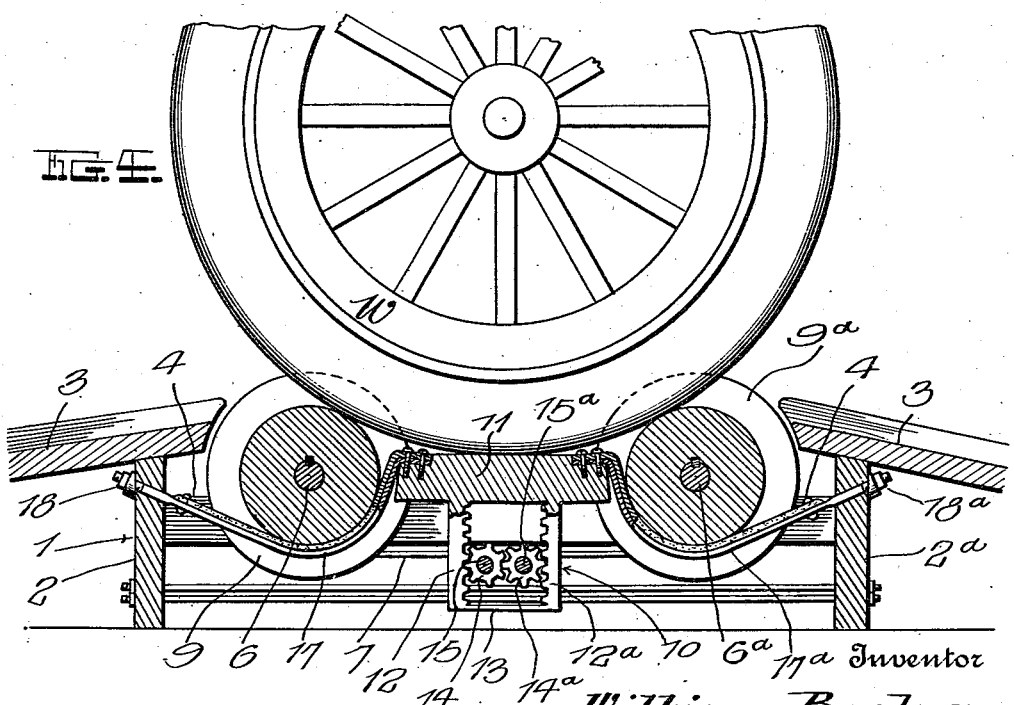

WILLIAM BECKER, OF LARNED, KANSAS.

POWER-TRANSMISSION DEVICE.

1,184,159. Specification of Letters Patent. Patented May 23, 1916.

Application filed July 19, 1915. Serial No. 40,737.

*To all whom it may concern:*

Be it known that I, WILLIAM BECKER, a citizen of the United States, residing at Larned, in the county of Pawnee and State of Kansas, have invented certain new and useful Improvements in Power-Transmission Devices; and I do declare the following to be a full, clear, and exact description of the invention, such as will enable others skilled in the art to which it appertains to make and use the same.

My invention relates to improvements in devices for transmitting power from the driven wheels of an automobile to machines of numerous classes to be operated.

One object of the invention is to provide means of this class which will not only be simple and inexpensive, but which will be highly efficient and durable and will readily perform the function for which it is designed.

Another object is to provide novel construction whereby an automobile may be made to leave the device under its own power.

With these and minor objects in view, the invention resides in certain novel features of construction and in unique combinations of parts to be hereinafter fully described and claimed, the descriptive matter being supplemented by the accompanying drawings wherein, Figure 1 is a side elevation of a device constructed in accordance with my invention, showing an automobile in position thereon for driving the same; Fig. 2 is a top plan view of the device; and Figs. 3 and 4 are vertical transverse sections as viewed along the plane indicated by the line 3—4 of Fig. 2, these views disclosing respectively the positions of parts when the machine is in operation, and the relation of such parts when the automobile is to be made to leave the device under its own power.

In describing the invention, I shall refer to the accompanying drawings by similar reference characters placed on corresponding parts throughout the several views, the numeral 1 designating broadly a rectangular frame which includes front and rear side bars 2 and 2ª standing on edge and a pair of end bars 4, the former supporting thereon the uppermost ends of a pair of inclines 3. The end bars 4 carry front and rear bearings 5 and 5ª in which front and rear parallel shafts 6 and 6ª are rotatably mounted, the two shafts being belted together as disclosed at 7, while the shaft 6 is provided with a pulley 8 from which a belt may be led to a machine to be driven. The front shaft 6 is provided adjacent its opposite ends with a pair of peripherally grooved pulleys 9, while immediately in rear of these pulleys and mounted on the shaft 6ª, is an additional pair of pulleys 9ª, the two pairs being adapted to receive therebetween the driving wheels W of an automobile A, when the rear end of the latter is elevated to the necessary extent by running the machine rearwardly up one of the inclines 3, the wheels W being then received in the grooves of the several pulleys as clearly shown in the drawings. When the wheels W are now rotated, all power imparted to the two shafts 6 and 6ª will be applied to the pulley 8 to drive any machine to be operated by the improved power transmitting device. When, however, the automobile is to be used for other purposes, it becomes highly essential to provide simple, yet efficient means whereby it may be made to travel from the power transmitting machine under the power of its own engine. For this purpose, the construction now to be described is employed.

Disposed between the front and rear pulleys 9 and 9ª is a pair of vertically movable jack members 10, such members including elongated blocks 11, front and rear rack bars 12 and 12ª depending from said blocks, connecting bars 13 secured to the lower ends of the rack bars, and front and rear pinions 14 and 14ª which mesh with each other and also with the rack bars 12 and 12ª. The pinions 14 and 14ª on opposite sides of the machine are shown as connected respectively by transverse shafts 15 and 15ª, whereby when one of these shafts is driven by a ratchet lever or the like 16, all of the pinions will be rotated in such directions as to raise or lower the rack bars and the blocks 11 thereon, according to the direction of rotation. Secured at their inner ends to the opposite ends of the blocks 11 are front and rear brake bands 17 and 17ª, the outer ends of said bands being adjustably anchored at 18 and 18ª to the front and rear bars 2 and 2ª of the bed frame 1.

By providing the construction above described, when the automobile is no longer required upon the power transmitting machine, the pinions 14 and 14ª are driven by the lever 16 or other device provided for the purpose, thus causing the blocks 11 to be raised. This movement on the part of these blocks will now apply the brake bands 17 and 17ª to the pulleys 9 and 9ª to retard movement thereof, and finally said blocks will be brought into contact with the tires of the wheels W. By the time this takes place, the brake bands have been effectively applied and since the wheels cannot slide upon the pulleys and blocks, they will move the entire automobile from its working position without injury to any parts of the power transmitting mechanism or the vehicle.

From the foregoing description, taken in connection with the accompanying drawings, it will be evident that although the invention is simple, inexpensive, and may well be constructed by unskilled mechanics, it will be highly efficient and durable and will fulfil a long felt need with a vast number of automobile owners.

In the drawings, certain specific details of construction have been shown for accomplishing probably the best results, and in the preceding such details have been described, but it will be evident that I need not be restricted thereto otherwise than to the extent to which the appended claims limit me.

I claim:—

1. In combination, a front pair of spaced axially alined pulleys, a rear pair of such pulleys alined with the front pulleys but spaced therefrom, whereby the driven wheels of a motor vehicle may be supported between the front and rear pairs, means for transmitting power from said pulleys, and vertically movable jack members between the front and rear pulleys for contact with the aforesaid wheels for the purpose specified.

2. In combination, a front pair of spaced axially alined pulleys, a rear pair of such pulleys alined with the front pulleys but spaced therefrom, whereby the driven wheels of a motor vehicle may be supported between the front and rear pairs, means for transmitting power from said pulleys, vertically movable members between the front and rear pulleys, and brake means applied to certain of said pulleys when said members are raised.

3. In combination, a front pair of spaced axially alined pulleys, a rear pair of such pulleys alined with the front pulleys but spaced therefrom, whereby the driven wheels of a motor vehicle may be supported between the front and rear pairs, means for transmitting power from said pulleys, vertically movable members between the front and rear pulleys for contact with the aforesaid wheels, and brake means applied to certain of the pulleys when said members are raised.

4. In combination, a front pair of spaced axially alined pulleys, a rear pair of such pulleys alined with the front pulleys but spaced therefrom, whereby the driven wheels of a motor vehicle may be supported between the front and rear pairs, means for transmitting power from said pulleys, vertically movable members between the front and rear pulleys, and brake bands passed beneath the pulleys, secured to the aforesaid members at one end, and anchored at their other end.

5. In combination, a front pair of spaced axially alined pulleys, a rear pair of such pulleys alined with the front pulleys but spaced therefrom, whereby the driven wheels of a motor vehicle may be supported between the front and rear pairs, means for transmitting power from said pulleys, vertically movable blocks between the front and rear pulleys for contact with the aforesaid wheels, a front rack bar depending from each block, a rear rack bar likewise depending from each block, front pinions meshed with the front rack bars, rear pinions meshed with the rear rack bars and with the aforesaid pinions, and means to rotate the pinions for raising and lowering the aforesaid blocks.

6. In combination, a front pair of spaced axially alined pulleys, a rear pair of such pulleys alined with the front pulleys but spaced therefrom, whereby the driven wheels of a motor vehicle may be supported between the front and rear pairs, means for transmitting power from said pulleys, vertically movable blocks between the front and rear pulleys, a front rack bar depending from each block, a rear rack bar likewise depending from each block, front pinions meshed with the front rack bars, rear pinions meshed with the rear rack bars and with the aforesaid pinions, means to rotate said pinions whereby to raise the blocks, and brake bands passed beneath the pulleys, anchored at one end, and secured to the aforesaid blocks at their other end.

In testimony whereof I have hereunto set my hand in presence of two subscribing witnesses.

WILLIAM BECKER.

Witnesses:
 GORDON EMMONS,
 DEXTER HOLMAN.